3,209,466
HOSE DRYING APPARATUS

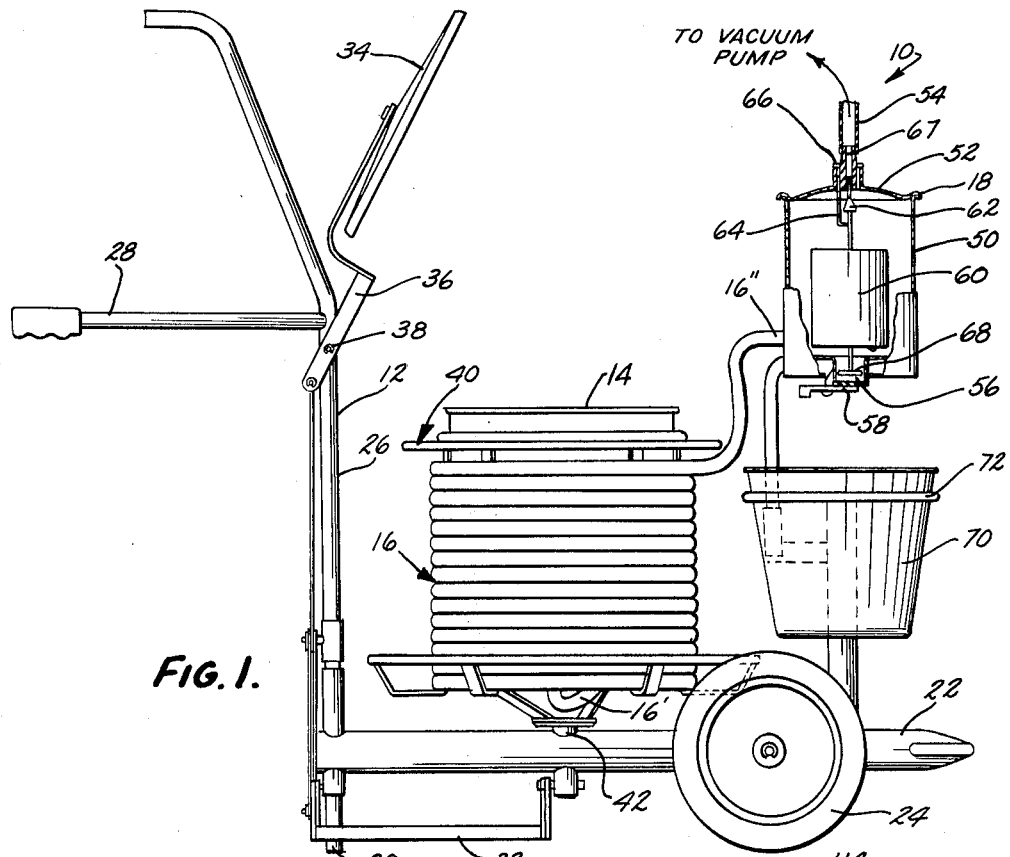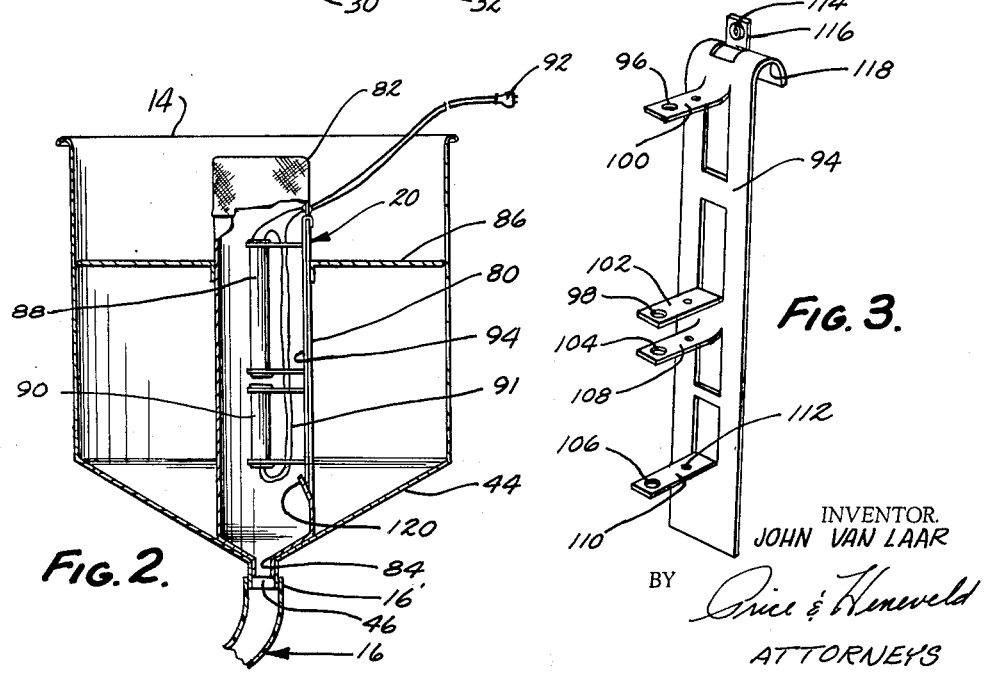

John Van Laar, Grand Rapids, Mich., assignor to Werner Machinery Company, Grand Rapids, Mich., a corporation of Michigan
Filed May 22, 1963, Ser. No. 282,410
8 Claims. (Cl. 34—104)

This invention relates to milk handling equipment, and more particularly to a hose drying unit removably mounted in the milk tank of a mobile milk cart, and used in combination with a vacuum pumping system.

The transfer of milk from milking machines adjacent individual cows to a large bulk storage tank has been greatly facilitated recently by the adoption of mobile milk handling equipment such as that described and claimed in U.S. Patent 3,088,483. This equipment includes a mobile cart upon which a milk receiving tank is mounted. The tank has a flexible hose of polymeric material, commonly plastic and normally transparent, attached to the bottom drain outlet and attached on its other end to a vacuum system. This vacuum system usually includes a milk releasing vessel operatively connected to a vacuum line and adapted to periodically dump milk into a large bulk storage tank.

Extensive use of such apparatus has shown that the plastic flexible hose becomes discolored after a period of use. This discoloration appears to be accompanied by a change in the characteristics of the hose preventing proper cleaning and causing promotion of bacterial growth. Experiments have shown that these changes are caused by the retention of moisture on the inner walls of the house after the hose is rinsed with water to clean out the milk. Consequently, to eliminate this bacterial growth and discoloration problem, the hose must be internally dried with air after each milk transferring and rinse operation. To be effective and efficient for drying, the air must be heated quickly, efficiently, and to a relatively high temperature, and flowed continuously through the hose. Unless the device operates rapidly and efficiently, the farmer will not take the time necessary to perform this important operation. Although the drying air must therefore be heated to a considerable temperature, the temperature of the air must not exceed a definite predetermined limit since the plastic hose will be damaged by overheated air.

It is therefore an object of this invention to provide a hose drying heated unit for milk handling apparatus that heats the drying air quickly, efficiently, and to a relatively high temperature, yet that prevents the air from being heated over a predetermined maximum to damage the hose. The air is thus heated to an optimum value for circulation through the hose, for maximum effectiveness and minimum possible drying time.

It is another object of this invention to provide a hose drying apparatus having a temperature controlled air heating device insertable as a unit into a mobile milk tank, and capable of cooperation with the vacuum pumping system of the milk handling apparatus to cause continuous air flow to dry the hose. The compact assembly enables the dairy farmer to insert the drying unit into the tank, operate it briefly for effective drying, and then remove it in a matter of a few seconds until it is needed again. The complete heating and temperature control assembly can be manufactured and assembled from relatively inexpensive components, enabling the total price of the apparatus to be relatively low. The dairy farmer can readily purchase the unit as an inexpensive accessory for his milk handling apparatus.

These and several other objects of this invention will become apparent upon studying the following specification in conjunction with the drawings in which:

FIG. 1 is a side elevational view of the mobile milk handling apparatus used in combination with the drying unit of this invention;

FIG. 2 is an enlarged sectional elevational view of the milk receiving tank forming a part of the assembly in FIG. 1 with the removable heater and temperature control assembly positioned therein; and FIG. 3 is a perspective enlarged view of the suspension bracket used for mounting the heater and temperature control unit in the air conduit sleeve illustrated in FIG. 2.

Briefly, the inventive apparatus comprises an air heating and temperature control assembly used in combination with mobile milk handling apparatus. The assembly comprises an elongated air conduit sleeve having an open upper end forming an air inlet, preferably covered by a screen, heater means centrally positioned in the conduit, temperature control means in the conduit downstream of the heater means, and an outlet spout at the bottom of the conduit sleeve interfitting with the drain outlet of milk receiving tank of the mobile milk handling apparatus. Supplemental radial aligning means extends radially of the sleeve to contact the tank and align the upper end of the sleeve.

Referring now specifically to the drawings, the complete milk handling equipment 10 illustrated in FIG. 1 includes a mobile cart 12, a milk receiving tank 14 mounted on the cart, a flexible hose 16 wound on reel 40 and attached at one end to the bottom of the tank and at the other end to vacuum milk releaser 18. Positioned within tank 14 is the temperature controlled heating unit 20 (FIG. 2).

The main components of the milk handling apparatus are like those described in the U.S. Patent 3,088,483 referred to above. The milk handling cart 12 includes a main support beam 22 suspended on a pair of wheels 24 for travel along the floor. An upright support 26 having a manual control handle 28 attached thereto is affixed to the rear of beam 22. The lower end of support 26 forms a floor stand 30.

A foot operated lever 32 is operably linked with the tank cover assembly 34 which includes a bracket 36 pivotally connected at 38 to support 26. The cover may thus be lifted from the open upper end of tank 14 by depressing the lever 32.

The flexible plastic hose 16 is wound upon a reel 40 which is rotatably mounted at 42 to beam 22. Positioned within and supported by the reel 40 is the milk receiving tank 14. This milk receiving tank includes a bottom drain outlet 46. The bottom 44 of the tank is sloped toward outlet 46. A suitable dump control valve (not shown) may be employed in this tank to control the conditions under which the milk is allowed to be removed from the tank through the flexible hose. The hose is connected to and extends from this outlet at 16' (FIGS. 1 and 2). The opposite end of the hose 16" is connected to an inlet into the milk releaser 18 which is vacuum operated.

This milk releaser includes a container 50 having a cover 52 through which connection is made to a vacuum pump (not shown) through a hose conduit 54. The releaser includes an outlet opening 56 on the lower end thereof controlled by pivotal valve 58. The valve is actuated by vacuum to close the opening, and is actuated by the weight of milk in tank 50 to open the opening. Float 60 controls vacuum valve 62 to open or close the passageway 67 to the vacuum supply at the opposite end of hose 54. It also controls the arm 64 which lifts the vent valve 66 to the atmosphere. This allows the milk to open valve 58 and drain when the float rises sufficiently to close off the vacuum passageway with the valve 62. The float is maintained aligned by guide element 68. The detailed operation of this releaser is described in U.S. Patent 3,008,-450 assigned to the assignee herein.

Suitable buckets 70 may be supported on the cart and used for rinsing or other operations. These buckets are supported in rings on vertical uprights 72 secured to beam 22.

During normal usage of the milk handling apparatus, milk is dumped into the milk receiving tank 14 until the float valve (not shown) is opened. The milk then passes out the drain outlet 46 and is transferred through the flexible hose 16 to the milk releaser 18 by the pressure differential between the atmospheric pressure in the tank 14 and the vacuum in the releaser 18. The releaser is often located at a substantial distance from the cart itself. After the milk rises in the releaser sufficiently to cause valve 62 to close vacuum passageway 67, valve 58 opens to cause the milk releaser to dump the milk into a bulk storage tank (not shown). At the completion of the milking, the dairy farmer dumps water into tank 14 and circulates water through the hose system, again utilizing the vacuum to conduct the water from tank 14.

After the milk transferring and rinsing operations are completed in accordance with prior teachings, the hose must be internally dried to remove moisture retained therein. This is achieved with the novel temperature controlled air heating unit 20 which is used in combination with the same vacuum system operating releaser 18, and effectuating the milk transfer.

This unit 20 comprises a cylindrical conduit sleeve 80 which has an open upper end forming an air inlet and covered by a dirt filtering screen 82. At the lower end of the sleeve is a necked down portion forming an outlet spout 84. The lower end of the sleeve is preferably tapered in a frusto-conical fashion to match the slope of the bottom 44 of tank 14. The outlet spout 84 interfits with the drain outlet 46 of tank 14 to form a relatively tight fit therearound so that air drawn through hose 16 passes through this sleeve and not around it. The lower end of the sleeve is thus accurately aligned in the tank while the remaining portions of the vertically oriented conduit are aligned in the tank by employing radially projecting flange elements 86 secured to the periphery of the sleeve and projecting radially outwardly to contact the inner wall of the tank 14.

Positioned within the sleeve, generally in the center thereof, is an elongated electrical resistance heating unit 88 to heat air passing around it and through the sleeve. Beneath the electrical heating unit and downstream of the air flow past the heating unit is a thermostatic switching control element 90. The heating element 88 may be of several different constructions, but preferably is a wound resistance heating element such as a Chromalox cartridge heating element. The heating unit is in electrical series with the thermostatic control unit 90 as shown by the wiring sequence 91 in FIG. 2. The two leads are attached to a suitable electrical plug 92 for connection into a conventional power outlet.

The heating and thermostatic temperature control elements are both mounted on a suspension bracket 94 formed of sheet metal. Heating element 88 is mounted in openings 96 and 98 of a pair of ears 100 and 102, respectively. These ears are die cut and bent from bracket 94 as illustrated in FIG. 3. Likewise, the thermostatic control element 90, downstream of the heating element, is mounted in orifices 104 and 106 in ears 108 and 110, respectively. These ears are also stamped from sheet metal bracket 94.

The electrical wiring for the elements extends through openings 112 in the ears and out through a grommet 114 formed in ear 116 protruding from the top of the bracket. Openings 112 may also include suitable grommets if desired.

The upper end of the bracket is curled over to form a suspension lip or hook 118. This enables the bracket to be suspended on the upper rim of sleeve 80 as illustrated in FIG. 2. The lower end of the bracket is preferably anchored by inserting it behind a die cut tab 120 severed and bent from sleeve 80. The heating and thermostatic control elements can thus be removed simultaneously from the sleeve merely by lifting screen 82 out of position and withdrawing bracket 94.

In the operation of drying the internal wall of the hose 16 using the novel assembly, plug 92 is attached to a suitable electrical outlet. The vacuum system is actuated to create a vacuum in the releaser 18 and hose 16 to draw air through screen 82, past heater 88, past thermostatic control 90, out spout 84, and through drain outlet 46 to the hose. The elongated and relatively small cross sectional configuration of sleeve 80 enables the air passing therethrough to be heated efficiently and effectively around the centrally positioned heater element 88, without the necessity of heating the large volume of air in the entire tank 14. Also, a flowing air heating condition results due to the continuous flow of air through the sleeve and past the heater. The assembly is therefore very efficient. The air is heated to a relatively high temperature for efficiency, yet is not heated to a temperature so high as to damage the plastic hose 16. Consequently, maximum effectiveness is obtained from the unit without surpassing the physical heat capacity of the hose itself. The dairy farmer may simply insert the unit in the tank, plug it in, allow it to operate for a short while to dry out the hose, remove the plug, and withdraw the unit from the tank in a simple, efficient, rapid operation, consuming little time and effort. Since the unit can be fabricated from relatively inexpensive sheet metal components, its initial cost is very reasonable, thereby encouraging the dairy farmer to purchase it as a component of the entire assembly and promote maximum sanitation of the milk handled by this equipment. The insertable heating assembly is relatively compact and lightweight, being easy to insert and remove.

Failure of the electrical heating element or the thermostatic control element, or both, does not necessitate a major repair since the elements can be removed from the sleeve and substituted by new ones.

Various additional advantages will readily occur to those in the art upon studying this form of the invention illustrated. Minor modifications of the illustrated structure can be made without departing from the principles taught. These obvious modifications are deemed to be part of this invention, which is to be limited only by the scope of the appended claims and the reasonably equivalent structures to those defined therein.

I claim:

1. Milk handling apparatus, comprising: a mobile milk cart including a receiving tank having a milk drain outlet on the bottom; a flexible hose attached to said drain outlet and operably connected on its other end to a vacuum system; a hose drying unit mounted in said tank, including an elongated air conduit having an air inlet at the top thereof, and an air outlet spout at the bottom thereof; said outlet spout slidingly interfitting removably with said drain outlet to align said spout with said outlet and configurated to fill said outlet to cause air drawn by said vacuum system through said hose to pass through said conduit; tank engaging alignment means 86 around said conduit to retain its upper end aligned in said tank; and electrical heater means positioned in said conduit between said air inlet and said air outlet for preheating air to pass through said hose.

2. The apparatus in claim 1 wherein said electrical heater means is mounted on a suspension bracket removably attached in said conduit.

3. The apparatus in claim 1 wherein said electrical heater means is in electrical series with thermostatic control means beneath said heater means in said conduit means to be downstream of said heater means, to thereby control the maximum temperature of air passing into said flexible tubing.

4. An air heater unit for removable insertion in a mobile milk tank having a flexible milk hose thereon, for drying the hose, comprising: an elongated air conduit sleeve having an open upper end for air entry, and an air outlet nipple on the bottom for insertion into the milk tank drain outlet; an electrical heater element suspended centrally in said sleeve for passage of air therearound to preheat the air before exiting out said air outlet; and alignment means projecting from the periphery of said sleeve for vertically aligning said sleeve in the milk tank when placed therein temporarily for drying the hose.

5. An air heater unit for removable insertion in a mobile milk tank having a flexible milk hose attached to its outlet for drying the hose, comprising: an elongated air conduit sleeve having an open upper end for air entry, and an air outlet nipple on the bottom thereof for insertion into the milk tank drain outlet; an electrical heater element suspended centrally in said sleeve for passage of air therearound to preheat the air before exiting out said air outlet; electrical thermostatic control means in electrical series with said heater element and positioned beneath said heater element to be downstream thereof for control of air temperature; and alignment means projecting from the periphery of said sleeve for vertically aligning said sleeve in a milk tank when placed therein temporarily for drying the hose.

6. The unit in claim 5 wherein said heater element and thermostatic control means are secured to a bracket removably suspended in said sleeve.

7. The unit in claim 4 wherein said open upper end is covered with a screen.

8. The unit in claim 6 wherein said bracket comprises a metal stamping having integral ears extending therefrom, supporting said heater element and control means, and a curled upper lip hooked over the upper edge of said sleeve.

References Cited by the Examiner
UNITED STATES PATENTS

| | | | |
|---|---|---|---|
| 684,741 | 10/01 | Bowman | 34—104 |
| 976,656 | 11/10 | Hoyt | 34—104 |
| 984,725 | 2/11 | Wilhite et al. | 34—104 |
| 2,049,812 | 8/36 | Loacker | 34—104 |
| 2,480,227 | 8/49 | Derr | 34—104 |
| 3,088,483 | 5/63 | Brunson | 137—355.12 |

PERCY L. PATRICK, *Primary Examiner.*

NORMAN YUDKOFF, *Examiner.*